US008860806B2

(12) United States Patent
Zhang et al.

(10) Patent No.: US 8,860,806 B2
(45) Date of Patent: Oct. 14, 2014

(54) METHOD, DEVICE, AND SYSTEM FOR PERFORMING COLOR ENHANCEMENT ON WHITEBOARD COLOR IMAGE

(75) Inventors: Wenbo Zhang, Beijing (CN); Yan Li, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 673 days.

(21) Appl. No.: 13/209,677

(22) Filed: Aug. 15, 2011

(65) Prior Publication Data
US 2012/0081548 A1 Apr. 5, 2012

(30) Foreign Application Priority Data

Sep. 30, 2010 (CN) .......................... 2010 1 0297783

(51) Int. Cl.
| | |
|---|---|
| *H04N 7/18* | (2006.01) |
| *G06K 9/00* | (2006.01) |
| *G06K 9/34* | (2006.01) |
| *G06K 9/46* | (2006.01) |
| *G06K 9/60* | (2006.01) |
| *H04N 5/77* | (2006.01) |
| *H04N 9/806* | (2006.01) |
| *G06K 9/22* | (2006.01) |
| *H04N 9/64* | (2006.01) |

(52) U.S. Cl.
CPC .............. *H04N 7/183* (2013.01); *G06K 9/4604* (2013.01); *G06K 9/60* (2013.01); *H04N 5/77* (2013.01); *H04N 9/806* (2013.01); *G06K 9/34* (2013.01); *G06K 9/222* (2013.01); *G06T 2207/20144* (2013.01); *G06T 2207/10016* (2013.01); *G06T 2207/10024* (2013.01); *H04N 9/646* (2013.01)

USPC .......... 348/143; 382/162; 382/164; 382/165; 382/167; 382/173; 382/176; 382/179

(58) Field of Classification Search
CPC .......... G06T 2207/10016; G06T 2207/10024; G06T 2207/20144; G06T 5/006; H04N 1/6027; H04N 1/4074; H04N 5/77; H04N 7/15; H04N 9/806; G11B 27/105; G06K 9/60; G06K 9/34
USPC .......... 348/143; 382/162, 164, 165, 167, 173, 382/176, 179
See application file for complete search history.

(56) References Cited

U.S. PATENT DOCUMENTS

| | | | |
|---|---|---|---|
| 5,450,217 A | 9/1995 | Eschbach et al. | |
| 6,188,788 B1 | 2/2001 | Renner et al. | |
| 7,260,278 B2 * | 8/2007 | Zhang et al. | 382/305 |
| 7,369,699 B1 | 5/2008 | Christie | |
| 7,433,104 B2 | 10/2008 | Cheo et al. | |

(Continued)

*Primary Examiner* — Gelek W Topgyal
(74) *Attorney, Agent, or Firm* — Oblon, Spivak, McClelland, Maier & Neustadt, L.L.P.

(57) ABSTRACT

Disclosed are a device, a method, and a system for enhancing color. The device comprises a unit used to extract a foreground portion from a whiteboard color image to serve as whiteboard contents; a unit used to stretch R, G, and B channel values of each of a plurality of foreground pixels forming the whiteboard contents; a unit used to adjust color tone of each of the foreground pixels; a unit used to adjust a ratio of color saturation degree to color intensity of each of the foreground pixels so as to cause the ratio to approach a ratio expectation value; and a unit used to increase the color saturation degree and the color intensity of each of the foreground pixel so as to cause the two to approach a color saturation degree expectation value and a color intensity expectation value $I_d$, respectively.

19 Claims, 6 Drawing Sheets

(56) References Cited

U.S. PATENT DOCUMENTS

| | | | |
|---|---|---|---|
| 7,496,229 B2* | 2/2009 | Zhang et al. | 382/176 |
| 2003/0234772 A1* | 12/2003 | Zhang et al. | 345/177 |
| 2004/0042680 A1* | 3/2004 | Saund | 382/274 |
| 2004/0165786 A1* | 8/2004 | Zhang et al. | 382/276 |
| 2005/0180631 A1* | 8/2005 | Zhang et al. | 382/173 |

* cited by examiner

FIG.3
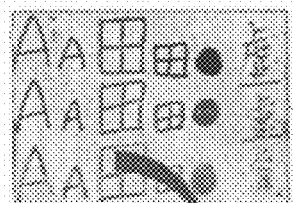
WHITEBOARD IMAGE
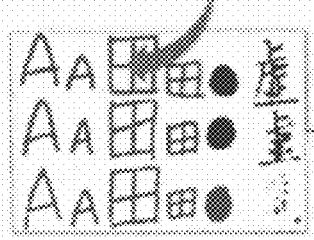
BINARY IMAGE
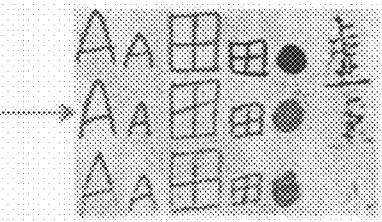
WHITEBOARD CONTENTS
(FOREGROUND IMAGE)
FIG.4
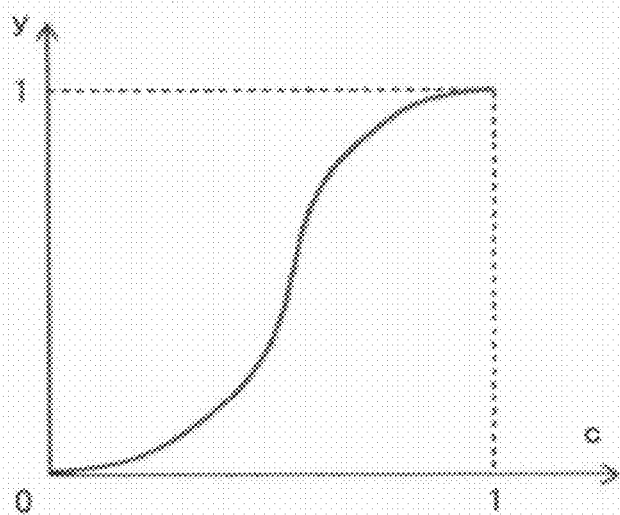

(Max, Mid, Min)   (Max+d1, Mid−2d1, Min+d1)

(R, G, B)   (R−d2, G−d2, B−d2)

(R, G, B)   (R−d3, G−d3, B−d3)   K*(R−d3, G−d3, B−d3)

FIG.8
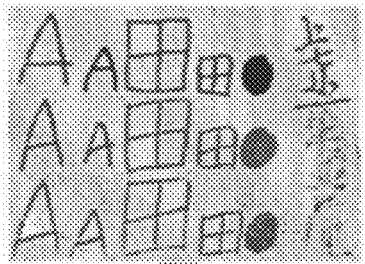
↓ STRETCHING COLOR CHANNELS
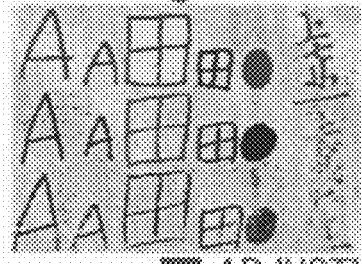
↓ ADJUSTING COLOR TONE
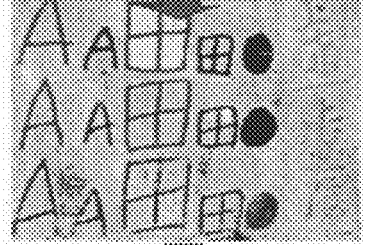
↓ ADJUSTING RATIO OF SATURATION DEGREE TO INTENSITY
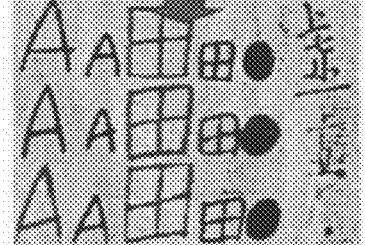
↓ INCREASING SATURATION DEGREE AND INTENSITY
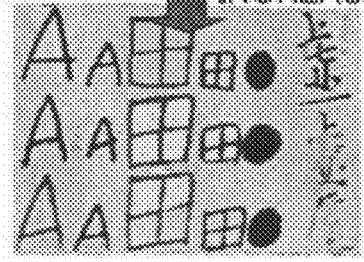

US 8,860,806 B2

METHOD, DEVICE, AND SYSTEM FOR PERFORMING COLOR ENHANCEMENT ON WHITEBOARD COLOR IMAGE

BACKGROUND OF THE INVENTION

1. Field of the Invention

The present invention relates to the field of digital image processing, and particularly relates to a method, a device, and a system for carrying out color enhancement with regard to a color image of a whiteboard. Contents of the whiteboard color image are things written on the whiteboard by a local user with a color whiteboard marker pen. By adjusting color tone, color saturation degree, and color intensity of the whiteboard color image, it is possible to enhance the color of the contents in the whiteboard color image.

2. Description of the Related Art

In a whiteboard content sharing system, color of a whiteboard color image output from the whiteboard content sharing system may be influenced by many factors.

One of the factors is setting of white balance and a camera head used in the whiteboard content sharing system. Another one of the factors is an image processing algorithm adopted in the whiteboard content sharing system, for example, an image subtraction algorithm.

In general, these kinds of factors may cause problems in relation to color distortion and color difference. For example, in an output whiteboard color image, color may become blurred and unglamorous, and may also become impure.

SUMMARY OF THE INVENTION

In order to solve the above described problems in the conventional technologies, a method, a device, and a system for carrying out color enhancement with regard to a color image of a whiteboard are provided in embodiments of the present invention. By carrying out correction processing with regard to color of whiteboard contents in the whiteboard color image, it is possible to cause the color of the whiteboard contents to become as pure as possible. Also, by carrying out enhancement processing with regard to the color of the whiteboard contents in the whiteboard color image, it is possible to cause the color of the whiteboard contents to become as glamorous as possible.

According to one aspect of the present invention, a device for carrying out color enhancement with regard to a color image of a whiteboard is provided. The device comprises a whiteboard content extraction unit used to extract a foreground portion from the whiteboard color image, and let the foreground portion serve as whiteboard contents; a color channel stretch unit used to stretch R, G, and B channel values of each of foreground pixels forming the extracted whiteboard contents; a color tone adjustment unit used to adjust, under a condition where color intensity of each of the foreground pixels is unchanged, color tone of the corresponding foreground pixel; a saturation degree to intensity ratio adjustment unit used to adjust, under a condition where the color tone of each of the foreground pixels is unchanged, a ratio of color saturation degree to color intensity of the corresponding foreground pixel so as to cause the ratio to approach a predetermined ratio expectation value $r_d$; and a saturation degree and intensity increase unit used to increase, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

According to another aspect of the present invention, a method of carrying out color enhancement with regard to a color image of a whiteboard is provided. The method comprises a whiteboard content extraction step of extracting a foreground portion from the whiteboard color image, and letting the foreground portion serve as whiteboard contents; a color channel stretch step of stretching R, G, and B channel values of each of foreground pixels forming the extracted whiteboard contents; a color tone adjustment step of adjusting, under a condition where color intensity of each of the foreground pixels is unchanged, color tone of the corresponding foreground pixel; a saturation degree to intensity ratio adjustment step of adjusting, under a condition where the color tone of each of the foreground pixels is unchanged, a ratio of color saturation degree to color intensity of the corresponding foreground pixel so as to cause the ratio to approach a predetermined ratio expectation value $r_d$; and a saturation degree and intensity increase step of increasing, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

According to still another aspect of the present invention, a whiteboard content sharing system is provided. The system comprises a video capture unit used to capture contents written on a whiteboard by a local user with a color whiteboard marker pen, and output the contents as a digital image; a calculation unit used to obtain a whiteboard color image including whiteboard contents by carrying out image subtraction with regard to a whiteboard image captured by the video capture unit and a remotely shared whiteboard image transferred from a remote system, and carry out color enhancement with regard to the whiteboard color image; a data transfer unit used to receive the shared whiteboard image from the remote system via a network, and send the whiteboard contents obtained by the calculation unit to the remote system; and a projection unit used to projecting the shared whiteboard image received from the remote system and the whiteboard contents obtained by the calculation unit on a screen for display. The calculation unit includes a whiteboard content extraction unit used to extract a foreground portion from the whiteboard color image, and let the foreground portion serve as the whiteboard contents; a color channel stretch unit used to stretch R, G, and B channel values of each of foreground pixels forming the extracted whiteboard contents; a color tone adjustment unit used to adjust, under a condition where color intensity of each of the foreground pixels is unchanged, color tone of the corresponding foreground pixel; a saturation degree to intensity ratio adjustment unit used to adjust, under a condition where the color tone of each of the foreground pixels is unchanged, a ratio of color saturation degree to color intensity of the corresponding foreground pixel so as to cause the ratio to approach a predetermined ratio expectation value $r_d$; and a saturation degree and intensity increase unit used to increase, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

The above described color enhancement device, color enhancement method, and whiteboard content sharing system may be utilized in the field of human-computer interaction. By employing the whiteboard content sharing system, users located at different positions may share and exchange contents written on the whiteboard by using a color whiteboard marker pen.

BRIEF DESCRIPTION OF THE DRAWINGS

FIG. 3 illustrates an example of a process of extracting whiteboard contents in a color image of a whiteboard.

FIG. 4 illustrates a functional curve of a mapping function adopted in color channel stretch.

FIG. 8 illustrates color variation after carrying out respective steps of a color enhancement method according to an embodiment of the present invention.

DETAILED DESCRIPTION OF THE PREFERRED EMBODIMENTS

Hereinafter, various embodiments of the present invention will be concretely described with reference to the drawings.

Here it should be noted that the same symbols, which are in the specification and the drawings, stand for constructional elements having the same or basically-same function and structure, and repeated explanations for the constructional elements are omitted in the specification.

Figure 1:
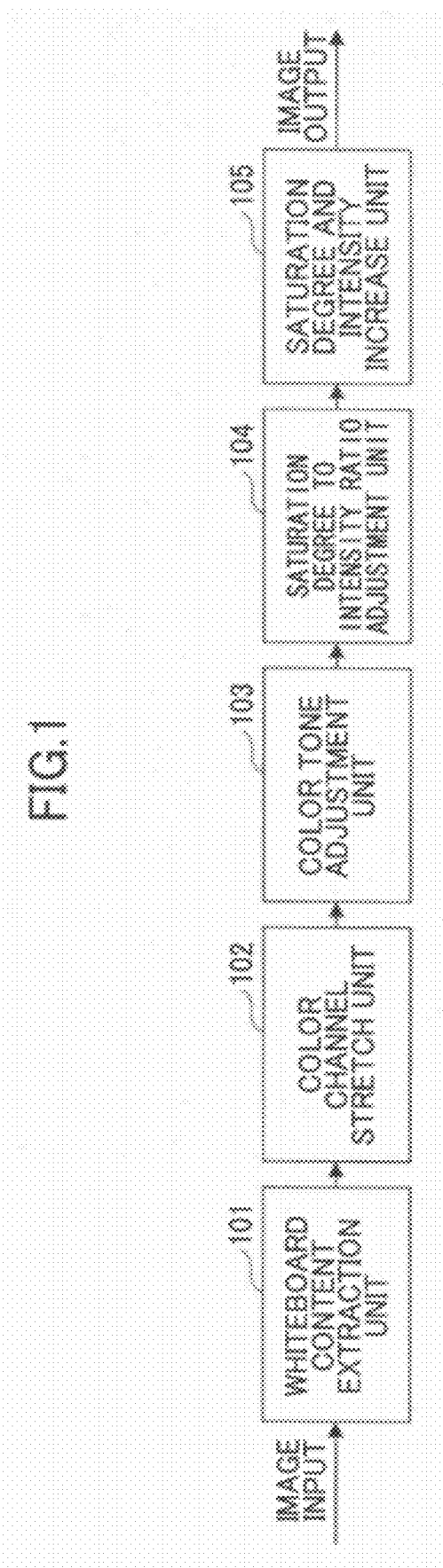
FIG. 1 is a block diagram of a device for carrying out color enhancement with regard to a color image of a whiteboard, according to an embodiment of the present invention.

FIG. 1 is a block diagram of a device for carrying out color enhancement with regard to a color image of a whiteboard, according to an embodiment of the present invention.

As shown in FIG. 1, the color enhancement device in this embodiment comprises a whiteboard content extraction unit 101, a color channel stretch unit 102, a color tone adjustment unit 103, a saturation degree to intensity ratio adjustment unit 104, and a saturation degree and intensity increase unit 105.

The whiteboard content extraction unit 101 is used to extract a foreground portion in an input whiteboard color image, and let the foreground portion serve as whiteboard contents. The whiteboard contents are things written on a whiteboard by a user with a color whiteboard marker pen. In other words, in the input whiteboard color image, the whiteboard contents may be considered as the foreground portion of the image, and the whiteboard itself may be considered as background of the whiteboard color image. The whiteboard color image may also include newly added contents which are written on the whiteboard by a local user. It is possible to extract the foreground portion by calculating pixel attributes such as brightness, color saturation degree, color intensity, etc.

The color channel stretch unit 102 is used to stretch R, G, and B channel values of respective pixels forming the whiteboard contents extracted from the whiteboard color image. A color channel stretch process will be concretely illustrated below by referring to FIG. 4.

The color tone adjustment unit 103 is used to adjust color tone values of respective pixels forming the extracted whiteboard contents under a condition where color intensity values of the respective pixels are unchanged. A color tone adjustment process will be concretely illustrated below by referring to FIG. 5.

The saturation degree to intensity ratio adjustment unit 104 is used to adjust proportional relationships of color saturation degree values to color intensity values of respective pixels forming the extracted whiteboard contents under a condition where color tone values of the respective pixels are unchanged. A saturation degree to intensity ratio adjustment process will be concretely illustrated below by referring to FIG. 6.

The saturation degree and intensity increase unit 105 is used to increase, under a condition where color tone values of the respective pixels are unchanged, color saturation degree values and color intensity values of respective pixels forming the extracted whiteboard contents so as to cause the two to approach predetermined relatively high values, respectively. A saturation degree and intensity increase process will be concretely illustrated below by referring to FIG. 7.

Figure 2:
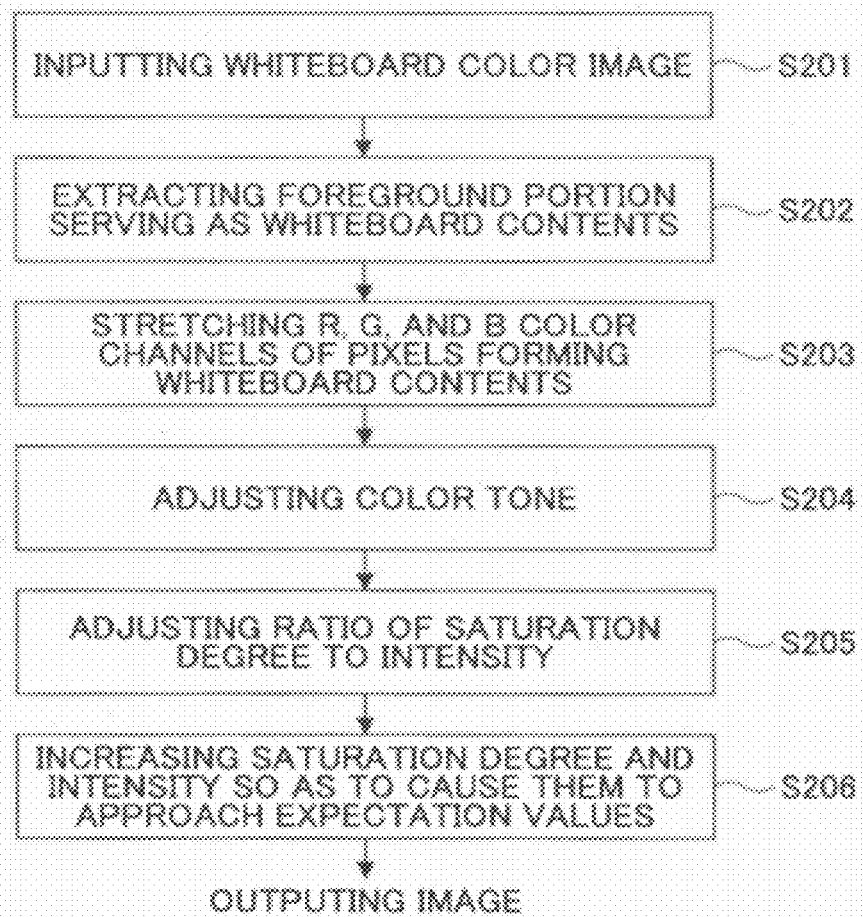
FIG. 2 is a flowchart of a method of carrying out color enhancement with regard to a color image of a whiteboard, according to an embodiment of the present invention.

FIG. 2 is a flowchart of a method of carrying out color enhancement with regard to a color image of a whiteboard, according to an embodiment of the present invention.

By referring to FIG. 2, the processing of this embodiment is concretely illustrated as follows.

In STEP S201, a whiteboard color image is input. After the whiteboard color image obtained in a whiteboard content sharing system is input into the above described color enhancement device, in STEP S202, the whiteboard content extraction unit 101 extracts whiteboard contents from the input whiteboard color image. In this embodiment, a foreground portion of the whiteboard color image is considered as the whiteboard contents, and color of the whiteboard contents needs to be enhanced. The foreground portion of the whiteboard color image is retained to serve as input of the following step; background of the whiteboard color image is omitted, i.e., does not need to be dealt with.

Next each of pixels forming the whiteboard contents (i.e., the foreground portion of the whiteboard color image) is dealt with as follows.

In STEP S203, the color channel stretch unit 102 stretches R, G, and B channel values of the corresponding pixel so as to increase color contrast.

In STEP S204, the color tone adjustment unit 103 adjusts color tone of the corresponding pixel under a condition where color intensity is unchanged so as to obtain relatively pure color.

In STEP S205, the saturation degree to intensity ratio adjustment unit 104 adjusts a ratio of color saturation degree to color intensity under a condition where the color tone of the corresponding pixel is unchanged so as to cause the ratio to approach an ideal expectation value.

In STEP S206, the saturation degree and intensity increase unit 105 increases the color saturation degree and the color intensity of the corresponding pixel under a condition where the color tone of the corresponding pixel is unchanged so as to obtain relatively glamorous color.

After all of the pixels forming the whiteboard contents are dealt with, the processing ends. Finally a digital image (i.e. an image after carrying out the color enhancement) is output.

FIG. 3 illustrates an example of a process of extracting whiteboard contents in a color image of a whiteboard.

Here the whiteboard contents refer to a foreground portion in the whiteboard color image; the whiteboard contents are things written on the whiteboard by a user with a color whiteboard marker pen. In other words, in the whiteboard color image, the foreground portion may be considered as the whiteboard contents, and the whiteboard itself may be considered as background of the whiteboard color image. It is possible to extract the foreground portion by calculating pixel attributes such as brightness, color saturation degree, color intensity, etc.

Since brightness of the whiteboard contents is generally less than that of the whiteboard itself, a brightness threshold value $T_{lightness}$ is defined for verifying whether a pixel belongs to the foreground portion. If the brightness value of the pixel is less than the brightness threshold value $T_{lightness}$, then it is determined that the pixel belongs to the foreground portion. Here the brightness value of the pixel may be obtained by calculating a weighted average value of R, G, and B channel values of the pixel as follows.

$$L(R,G,B)=\text{Lightness}(R,G,B)=0.299*R+0.587*G+0.114*B \quad (1)$$

The above mentioned brightness threshold value $T_{lightness}$ may be calculated by employing a conventional self-adaptive threshold algorithm, for example, Bernsen algorithm or Niblack algorithm. Various brightness threshold values may be obtained by applying this kind of self-adaptive threshold algorithm to different whiteboard color images.

Similarly it is possible to define a color saturation degree threshold value $T_{saturation}$ and a color intensity threshold value $T_{intensity}$. That is, each of color saturation degree values of foreground pixels has to be greater than the color saturation degree threshold value $T_{saturation}$; in the meantime, each of color intensity values of the foreground pixels has to be greater than the color intensity threshold value $T_{intensity}$ too. As described above, the color saturation degree value and the color intensity value of the corresponding pixel may also be calculated according to R, G, and B channel values of the corresponding pixel as follows.

$$S(R,G,B)=\text{Saturation}(R,G,B)=1-3\text{Min}(R,G,B)/(R+G+B) \quad (2)$$

$$I(R,G,B)=\text{Intensity}(R,G,B)=((R+G+B)/255)/3 \quad (3)$$

In most cases, the above mentioned color saturation degree threshold value and the color intensity threshold value may be empirical values, respectively. For example, in this embodiment, the color saturation degree threshold value $T_{saturation}$ may be 0.03, and the color intensity threshold value $T_{intensity}$ may be 0.1. However, those people skilled in the art may understand that the color saturation degree threshold value $T_{saturation}$ and the color intensity threshold value $T_{intensity}$ are not limited to these values; in other words, it is also possible to set the color saturation degree threshold value $T_{saturation}$ and the color intensity threshold value $T_{intensity}$ to other proper values according to an actual circumstance.

FIG. 4 illustrates a functional curve of a mapping function adopted in color channel stretch.

Here the color channel stretch means that as for each of pixels forming the above described whiteboard contents (i.e. the foreground portion of the whiteboard color image), R, G, and B channels of the corresponding pixel are stretched by utilizing a mapping function so as to increase color contrast.

The mapping function is given by the following equation.

$$y = \begin{cases} \frac{1}{2}(2c)^{p1} & 0 \le c \le 0.5 \\ \frac{1}{2}(2c-1)^{p2} + 0.5 & 0.5 < c \le 1.0 \end{cases} \quad (4)$$

Here c refers to a color channel value that serves as input of the mapping function. c is a value ranged between 0 and 1, obtained by carrying out normalization with regard to R, G, and B channel values, respectively. For example, if a result "R/255" obtained by carrying out the normalization with regard to R channel serves as c, and is substituted into the equation (4), then $y_R$ is obtained. Similarly it is possible to obtain $y_G$ by letting a result, obtained by carrying out the normalization with regard to G channel, be c, and substituting it into the equation (4). It is also possible to obtain $y_B$ by letting a result, obtained by carrying out the normalization with regard to B channel, be c, and substituting it into the equation (4).

y stands for a result after carrying out the channel stretch with regard to each of the color channels, and serves as output of the mapping function. The value of y ranges between 0 and 1 too.

p1 and p2 serve as parameters; in most cases, the values of p1 and p2 may be empirical values, respectively. For example, p1 may be 20, and p2 may be 0.167 in this embodiment. However, those people skilled in the art should understand that the values of p1 and p2 may be set to other proper values according to an actual circumstance.

Figure 5:
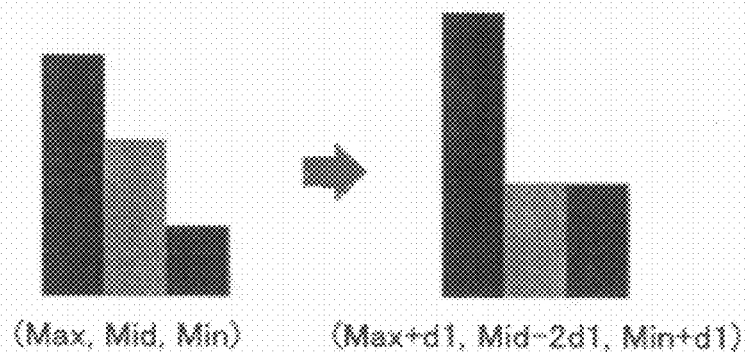
FIG. 5 illustrates an example of variation of R, G, and B channel values when adjusting color tone under a condition where color intensity is unchanged.

FIG. 5 illustrates an example of variation of R, G, and B channel values when adjusting color tone under a condition where color intensity is unchanged.

Here the color tone adjustment means that if it is expected to obtain relatively pure color, then for each of pixels forming the above described whiteboard contents (i.e. the foreground portion of the whiteboard color image), R, G, and B channel values of the corresponding pixel are adjusted, under a condition where color intensity of the corresponding pixel is unchanged. This is to let the intermediate one of the three color channel values be equal to the minimum one of the three color channel values.

To let the intermediate one of the three color channel values be equal to the minimum one of the three color channel values means to increase the minimum one and decrease the intermediate one so as to let the two be equal.

In addition, the condition where the color intensity of the corresponding pixel is unchanged means that the sum of the R, G, and B channel values is unchanged after the color tone adjustment. As a result, the adjusted values of the R, G, and B channels are Max'=Max+d, Mid'=Mid−2*d1, and Min'=Min+d1. Here Max, Mid, and Min stands for the maximum one, the intermediate one, and the minimum one of the R, G, and B channel values before the color tone adjustment, respectively; Max', Mid', and Min' stands for the maximum one, the intermediate one, and the minimum one of the R, G, and B channel values after the color tone adjustment, respectively; and d1 stands for adjustment amount. Namely there exists a relationship that is Mid−2*d1=Min+d1. If it is con sidered that the values of R, G, and B channels are in a range of 0 to 255, then the following relationship may be obtained.

$$\begin{cases} Mid - 2*d1 = Min + d1 \\ Max + d1 \le 255 \\ Min + d1 \le 255 \\ Mid - 2*d1 \ge 0 \end{cases} \quad (5)$$

Therefore the adjustment amount d1 may be obtained by the following equation.

$$d1 = \text{Minimum}((Mid-Min)/3, Mid/2, 255-Max) \quad (6)$$

Figure 6:
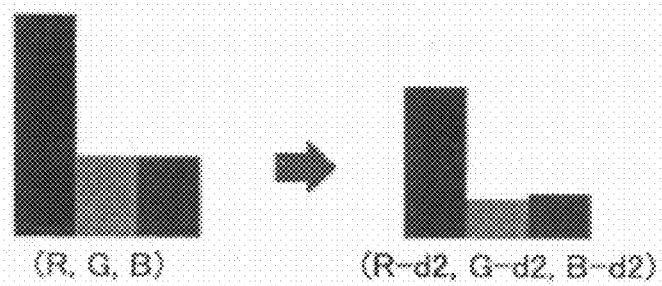
FIG. 6 illustrates an example of variation of R, G, and B channel values when adjusting a ratio of color saturation degree to color intensity under a condition where color tone is unchanged.

FIG. 6 illustrates an example of variation of R, G, and B channel values when adjusting a ratio of color saturation degree to color intensity under a condition where color tone is unchanged.

Here adjusting the ratio of color saturation degree to color intensity means that as for each of pixels forming the above described whiteboard contents (i.e., the foreground portion of the whiteboard color image), a ratio r of color saturation degree to color intensity of the corresponding pixel is adjusted, under a condition where the color tone of the corresponding pixel is unchanged, so as to cause the ratio r to approach an ideal expectation value $r_d$. The ratio r is defined as follows: r=saturation degree/intensity. The ideal expectation value $r_d$ of the ratio r may be an empirical value set according to an actual environment, for example, such as 2.

Similarly the color saturation degree and the color intensity of the corresponding pixel may also be calculated according to the above described equations (2) and (3); that is, they are real numbers in a range of 0 and 1, obtained by calculating weighted average values of the R, G, and B channel values of the corresponding pixel, and carrying out normalizations with regard to the calculation results.

In addition, the condition where the color tone of the corresponding pixel is unchanged means that it is necessary to subtract a same value d2 (i.e. adjustment amount) from the R, G, and B channel values of the corresponding pixel.

That is, if it is assumed that original color of the corresponding pixel is expressed as (R, G, B), and color of the corresponding pixel after the ratio adjustment is expressed as (R', G', B'), then there exists a relationship that is (R', G', B')=(R−d2, G−d2, B−d2). In the meantime, if definitions of the color saturation degree and the color intensity are considered, then the following relationship may be obtained.

$$\begin{cases} (R', G', B') = (R-d2, G-d2, B-d2) \\ S' = r_d * I' \\ S' = 1 - 3\text{Min}(R', G', B')/(R' + G' + B') \\ I' = ((R' + G' + B')/255)/3 \\ S = 1 - 3\text{Min}(R, G, B)/(R + G + B) \\ I = ((R + G + B)/255)/3 \end{cases} \quad (7)$$

By carrying out the operation of this step, it is possible to increase the degree of saturation of color and decrease the intensity of color of the corresponding pixel. As a result, it is possible to finally cause the ratio of color saturation degree to color intensity to approach an ideal expectation value.

Here S and I stand for the degree of saturation of color and the intensity of color of the corresponding pixel before the ratio adjustment, respectively; S' and I' stand for the degree of saturation of color and the intensity of color of the corresponding pixel after the ratio adjustment. As a result, the following equation may be derived from the equation (7).

$$\begin{cases} S' = r_d * I' \\ S' = 1 - ((\text{Min}(R, G, B) - d2)/255)/(I - d2/255) \\ I' = I - d2/255 \end{cases} \quad (8)$$

Furthermore the adjustment amount d2 may be obtained as follows.

$$d2 = 255I - \sqrt{\frac{255(255I - \text{Min}(R, G, B))}{r_d}} \quad (9)$$

Here it should be noted that I stands for the intensity of color, and I=((R+G+B)/255)/3. As a result, the adjustment amount d2 may be finally obtained as follows.

$$d2 = \frac{R + G + B}{2} - \sqrt{\frac{255(R + G + B - 3\text{Min}(R, G, B))}{3r_d}} \quad (10)$$

Figure 7:
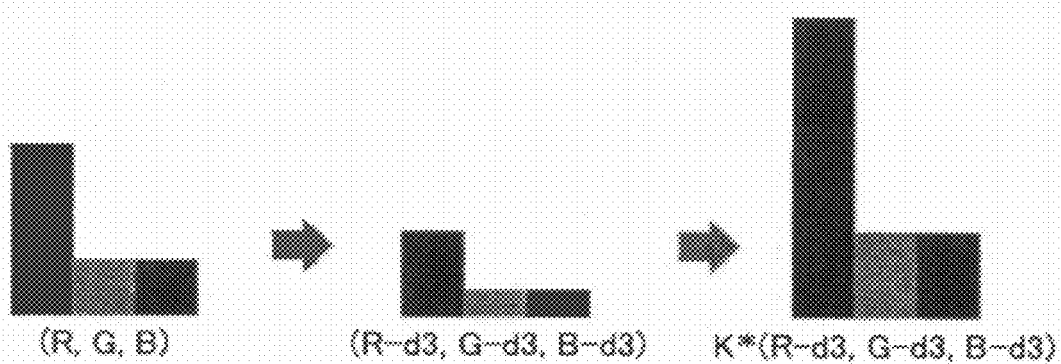
FIG. 7 illustrates an example of variation of R, G, and B channel values when increasing, under a condition where color tone is unchanged, color saturation degree and color intensity so as to cause the color saturation degree and the color intensity to approach ideal expectation values, respectively.

FIG. 7 illustrates an example of variation of R, G, and B channel values when increasing, under a condition where color tone is unchanged, degree of saturation of color and intensity of color so as to cause the two to approach ideal expectation values, respectively.

Here increasing the degree of saturation of color and the intensity of color means that as for each of pixels forming the above described whiteboard contents (i.e., the foreground portion of the whiteboard color image), increasing, under the condition where the color tone of the corresponding pixel is unchanged, the degree of saturation of color and the intensity of color of the corresponding pixel so as to cause the two to approach relatively high values, respectively.

In particular, increasing the degree of saturation of color under the condition where the color tone of the corresponding pixel is unchanged means subtracting a same value d3 (i.e. adjustment amount) from R, G, and B channel values of the corresponding pixel as the step shown in FIG. 6 did. However, the definition of the adjustment amount d3 in this step is different from that in the step shown in FIG. 6.

That is, if it is assumed that original color of the corresponding pixel is expressed as (R, G, B), and color of the corresponding pixel after the color saturation degree adjustment is expressed as (R2, G2, B2), then there exists a relationship that is (R2, G2, B2)=(R−d3, G−d3, B−d3). In the meantime, if a definition of the degree of saturation is considered, then the following derivation may be obtained.

$$\begin{aligned} S_d &= 1 - 3\text{Min}(R2, G2, B2)/(R2 + G2 + B2) \quad (11) \\ &= 1 - 3(\text{Min}(R, G, B) - d3)/(R + G + B - 3d3) \Rightarrow d3 \\ &= (3\text{Min}(R, G, B) - (1 - s_d)(R + G + B))/(3S_d) \end{aligned}$$

Here $S_d$ stands for an ideal expectation value of color saturation degree. In most cases, $S_d$ may be an experimental value or an empirical vale, for example, such as 0.8. Furthermore, since values of R, G, and B channels need to be within a range of 0 to 255, it is also necessary to satisfy the following relationship.

$$\begin{cases} R - d3 \geq 0 \\ G - d3 \geq 0 \\ B - d3 \geq 0 \end{cases} \quad (12)$$

$$\Rightarrow d3 \leq \text{Min}(R, G, B)$$

Therefore the adjustment amount d3 may be obtained as follows.

$$d3 = \text{Min}(3\text{Min}(R,G,B) - (1-s_d)(R+G+B))/(3S_d), \text{Min}(R, G, B)) \quad (13)$$

In addition, increasing the color intensity under the condition where the color tone is unchanged means that after increasing the degree of saturation of color, it is necessary to multiply all of the color channel values by a coefficient K.

That is, if it is assumed that color of the corresponding pixel after increasing the degree of saturation of color is expressed as (R2, G2, B2), and color of the corresponding pixel after increasing the intensity of color is expressed as (R2', G2', B2'), then there exists a relationship that is (R2', G2', B2')=K*(R2, G2, B2)=(K*R2, K*G2, K*B2).

The coefficient K is defined as K=$I_d$/I2.

Here $I_d$ stands for an ideal expectation value of color intensity; I2 stands for color intensity of the color (R2, G2, B2) of the corresponding pixel. It should be noted that $I_d$ may be an empirical value within a range of 0 to 1; for example, in most cases, $I_d$ may be 0.4. I2 may be obtained according to the above described equation (3), i.e., by calculating a weighted average value of the R, G, and B channel values of the color (R2, G2, B2) of the corresponding pixel.

FIG. 8 illustrates color variation after carrying out respective steps of a color enhancement method according to an embodiment of the present invention.

Figure 9:
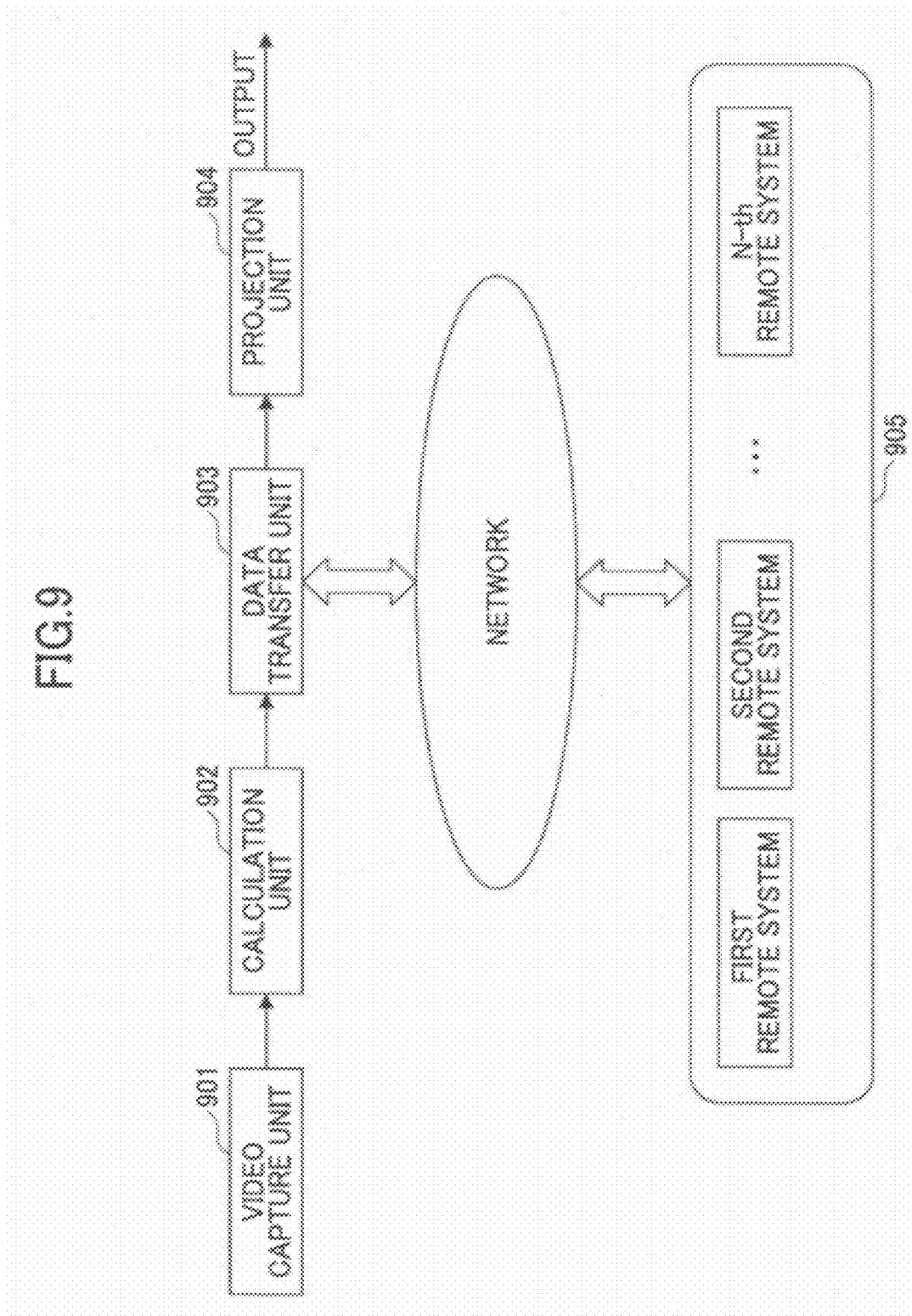
FIG. 9 illustrates a whiteboard content sharing system according to an embodiment of the present invention.

FIG. 9 illustrates a whiteboard content sharing system according to an embodiment of the present invention.

The whiteboard content sharing system shown in FIG. 9 may be used to share, at different locations, contents written on a whiteboard by utilizing image subtraction, image transfer, and a whiteboard image captured by a camera head. The whiteboard content sharing system includes a video capture unit 901, a calculation unit 902, a data transfer unit 903, and a projection unit 904.

The video capture unit 901 may be, for example, a camera head. It is used to capture the contents written on the whiteboard by a local user with a color whiteboard marker pen, and output the contents as a digital image prepared to be dealt with in the following process.

The calculation unit 902 includes the units shown in FIG. 1. It is used to obtain newly added contents on the whiteboard, let the newly added contents serve as the whiteboard contents by carrying out the image subtraction with regard to a whiteboard image captured by the video capture unit 901 and a remotely shared whiteboard image transferred from a remote system 905, and carry out color enhancement with regard to a whiteboard color image including the whiteboard contents. Since the color enhancement operations of the whiteboard color image are the same with the steps described above by referring to FIGS. 1 to 8, they are omitted here.

The data transfer unit 903 is used to receive the shared whiteboard image from the remote system 905 via a network, and send the whiteboard contents (i.e., the newly added contents on the whiteboard) obtained by the calculation unit 902 to the remote system 905.

The projection unit 904 may be, for example, a projector. It is used to serve as an output unit for projecting the shared whiteboard image received from the remote system 905 or the whiteboard contents (i.e., the newly added contents on the whiteboard) obtained by the calculation unit 902 on, for example, a screen or a wall.

Up to here, the color enhancement method, the color enhancement device, and the whiteboard content sharing system according to the embodiments of the present invention have been concretely illustrated by referring to FIGS. 1 to 9. Here it should be noted that those people skilled in the art may understand that the steps in the color enhancement method may be realized by a computer program. The computer program may be provided to a common-purpose computer, a designated computer, a programmable data processor, etc., for use.

Furthermore the computer program may also be stored in a computer-readable medium such as a hard disk, an optical disk, a magneto-optical disk, a semiconductor memory, etc.

In addition, the steps in the color enhancement method (or the functions of the units in the color enhancement device or in the whiteboard content sharing system) in the embodiments of the present invention may be carried out according to the illustrated order in the drawings; however, it is not always necessary to carry out them in this order. That is, some steps (or some functions) may be carried out in parallel or in a different order.

While the present invention is described with reference to the specific embodiments chosen for purpose of illustration, it should be apparent that the present invention is not limited to these embodiments, but numerous modifications could be made thereto by those people skilled in the art without departing from the basic concept and scope of the present invention.

The present application is based on Chinese Priority Patent Application No. 201010297783.6 filed on Sep. 30, 2010, the entire contents of which are hereby incorporated by reference.

What is claimed is:

1. A color enhancement device for carrying out color enhancement with regard to a whiteboard color image comprising:
   a whiteboard content extraction unit used to extract a foreground portion from the whiteboard color image, and let the foreground portion serve as whiteboard contents;
   a color channel stretch unit used to stretch R, G, and B channel values of each of a plurality of foreground pixels forming the extracted whiteboard contents;
   a color tone adjustment unit used to adjust, under a condition where color intensity of each of the foreground pixels is unchanged, color tone of the corresponding foreground pixel;
   a saturation degree to intensity ratio adjustment unit used to adjust, under a condition where the color tone of each of the foreground pixels is unchanged, a ratio of color saturation degree to color intensity of the corresponding foreground pixel so as to cause the ratio to approach a predetermined ratio expectation value $r_d$; and
   a saturation degree and intensity increase unit used to increase, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

2. The color enhancement device according to claim 1, wherein:
the whiteboard content extraction unit extracts the foreground portion by calculating brightness, color saturation degree, and color intensity of a pixel in the whiteboard color image according to the following equations:

$$L(R,G,B)=0.299*R+0.587*G+0.114*B;$$

$$S(R,G,B)=1-3\text{Min}(R,G,B)/(R+G+B); \text{ and}$$

$$I(R,G,B)=((R+G+B)/255)/3,$$

wherein,
the L stands for the brightness, the S stands for the color saturation degree, and I stands for the color intensity.

3. The color enhancement device according to claim 2, wherein:
If the brightness value of the pixel is greater than a predetermined brightness threshold value, the color saturation degree value of the pixel is greater than a predetermined color saturation degree threshold value, and the color intensity value of the pixel is greater than a predetermined color intensity threshold value, then it is determined that the pixel belongs to the foreground portion.

4. The color enhancement device according to claim 3, wherein:
the color channel stretch unit stretches the R, G, and B channel values of each of the foreground pixels by employing the following equation:

$$y = \begin{cases} \frac{1}{2}(2c)^{p1} & 0 \leq c \leq 0.5 \\ \frac{1}{2}(2c-1)^{p2} + 0.5 & 0.5 < c \leq 1.0, \end{cases}$$

wherein,
y stands for the stretched result of each of the R, G, and B channel values of the corresponding foreground pixel, and 0≤y≤1;
c stands for a normalized value obtained by carrying out normalization with regard to each of the R, G, and B channel values of the corresponding foreground pixel, and 0≤c≤1; and
p1 and p2 stand for different empirical values set according to an actual circumstance.

5. The color enhancement device according to claim 4, wherein:
the color tone adjustment unit does not change the color intensity of each of the foreground pixels by letting the sum of the R, G, and B channel values of the corresponding foreground pixel be unchanged.

6. The color enhancement device according to claim 5, wherein:
the color tone adjustment carried out by the color tone adjustment unit is realized by adjusting the R, G, and B channel values of each of the foreground pixels so as to cause the intermediate one of the three channel values of the corresponding foreground pixel to be equal to the minimum one of the three channel values of the corresponding foreground pixel,
wherein, the three channel values after the color tone adjustment satisfy the following equations:

Max'=Max+d1;

Mid'=Mid−2*d1;

Min'=Min+d1; and

Mid−2*d1=Min+d1, wherein, Max', Mid', and Min' stand for the maximum one, the intermediate one, and the minimum one of the three channel values of the corresponding foreground pixel after the color tone adjustment; Max, Mid, and Min stand for the maximum one, the intermediate one, and the minimum one of the three channel values of the corresponding foreground pixel before the color tone adjustment; and d1 stands for first adjustment amount,
wherein, by considering that the three channel values of the corresponding foreground pixel ranges between 0 to 255 and employing the following relationships:

$$\begin{cases} \text{Mid} - 2*d1 = \text{Min} + d1 \\ \text{Max} + d1 \leq 255 \\ \text{Min} + d1 \leq 255 \\ \text{Mid} - 2*d1 \geq 0, \end{cases}$$

the first adjustment amount d1 is obtained as follows:

$$d1=\text{Minimum}((\text{Mid}-\text{Min})/3,\text{Mid}/2,255-\text{Max}).$$

7. The color enhancement device according to claim 6, wherein:
the ratio of color saturation degree to color intensity of each of the foreground pixels is defined as follows: r=color saturation degree/color intensity,
the saturation degree to intensity ratio adjustment unit does not change the color tone of each of the foreground pixels by subtracting second adjustment amount d2 from the R, G, and B channel values of the corresponding foreground pixel, i.e., (R', G', B')=(R−d2, G−d2, B−d2), wherein, (R', G', B') stands for the three channel values of the corresponding foreground pixel after the ratio adjustment, and (R, G, B) stands for original values of the three channels of the corresponding foreground pixel,
wherein, the three channel values of the corresponding foreground pixel adjusted by the saturation degree to intensity ratio adjustment unit satisfy the following relationships:

$$\begin{cases} (R', G', B') = (R - d2, G - d2, B - d2) \\ S' = r_d * I' \\ S' = 1 - 3\text{Min}(R', G', B')/(R' + G' + B') \\ I' = ((R' + G' + B')/255)/3 \\ S = 1 - 3\text{Min}(R, G, B)/(R + G + B) \\ I = ((R + G + B)/255)/3, \end{cases}$$

wherein, S' and I' stand for the color saturation degree and the color intensity of the corresponding pixel after the ratio adjustment; S and I stand for the color saturation degree and the color intensity of the corresponding pixel before the ratio adjustment; and the second adjustment amount d2 is as follows:

$$d2 = \frac{R+G+B}{3} - \sqrt{\frac{255(R+G+B-3\text{Min}(R,G,B))}{3r_d}}.$$

8. The color enhancement device according to claim 7, wherein:
the saturation degree and intensity increase unit does not change the color tone of each of the foreground pixels by subtracting third adjustment amount d3 from the R, G, and B channel values of the corresponding pixel, i.e., (R2, G2, B2)=(R−d3, G−d3, B−d3), wherein, (R2, G2, B2) stands for the three channel values of the corresponding foreground pixel after the color saturation degree increase, and (R, G, B) stands for the original values of the three channels of the corresponding foreground pixel,
the saturation degree and intensity increase unit increases the color saturation degree of each of the foreground pixels so as to cause the color saturation degree of the corresponding foreground pixel to satisfy the following relationship:

$$S_d = 1 - 3\text{Min}(R2, G2, B2)/(R2 + G2 + B2)$$
$$= 1 - 3(\text{Min}(R, G, B) - d3)/(R + G + B - 3d3) \Rightarrow d3$$
$$= (3\text{Min}(R, G, B) - (1 - s_d)(R + G + B))/(3S_d),$$

wherein, by considering that the three channel values of the corresponding foreground pixel ranges between 0 to 255 and employing the following relationship:

$$\begin{cases} R - d3 \geq 0 \\ G - d3 \geq 0 \\ B - d3 \geq 0 \end{cases}$$
$$\Rightarrow d3 \leq \text{Min}(R, G, B),$$

the third adjustment amount d3 is obtained as follows:

$$d3 = \text{Min}(3\text{Min}(R,G,B)-(1-s_d)(R+G+B))/(3S_d),\text{Min}(R,G,B)).$$

9. The color enhancement device according to claim 8, wherein:
the saturation degree and intensity increase unit increases the color intensity of each of the foreground pixels by multiplying the R, G, and B channel values of the corresponding foreground pixel by a coefficient K, i.e., (R2', G2', B2')=K*(R2, G2, B2)=(K*R2, K*G2, K*B2), wherein, (R2', G2', B2') stands for the three channel values of the corresponding foreground pixel after the color intensity increase; (R2, G2, B2) stands for the three channel values of the corresponding foreground pixel after the color saturation degree increase; and the coefficient K is defined as K=Id/I2, and I2 stands for color intensity of the corresponding pixel whose R, G, and B channel values are (R2, G2, B2).

10. A color enhancement method of carrying out color enhancement with regard to a whiteboard color image comprising:
a whiteboard content extraction step of extracting a foreground portion from the whiteboard color image, and letting the foreground portion serve as whiteboard contents;
a color channel stretch step of stretching R, G, and B channel values of each of a plurality of foreground pixels forming the extracted whiteboard contents;
a color tone adjustment step of adjusting, under a condition where color intensity of each of the foreground pixels is unchanged, color tone of the corresponding foreground pixel;
a saturation degree to intensity ratio adjustment step of adjusting, under a condition where the color tone of each of the foreground pixels is unchanged, a ratio of color saturation degree to color intensity of the corresponding foreground pixel so as to cause the ratio to approach a predetermined ratio expectation value $r_d$; and
a saturation degree and intensity increase step of increasing, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

11. The color enhancement method according to claim 10, wherein:
in the whiteboard content extraction step, the foreground portion is extracted by calculating brightness, color saturation degree, and color intensity of a pixel in the whiteboard color image according to the following equations:

$$L(R,G,B)=0.299*R+0.587*G+0.114*B;$$

$$S(R,G,B)=1-3\text{Min}(R,G,B)/(R+G+B);\text{ and}$$

$$I(R,G,B)=((R+G+B)/255)/3,$$

wherein,
the L stands for the brightness, the S stands for the color saturation degree, and I stands for the color intensity.

12. The color enhancement method according to claim 11, wherein:
in the whiteboard content extraction step, if the brightness value of the pixel is greater than a predetermined brightness threshold value, the color saturation degree value of the pixel is greater than a predetermined color saturation degree threshold value, and the color intensity value of the pixel is greater than a predetermined color intensity threshold value, then it is determined that the pixel belongs to the foreground portion.

13. The color enhancement method according to claim 12, wherein:
in the color channel stretch step, the R, G, and B channel values of each of the foreground pixels are stretched by employing the following equation:

$$y = \begin{cases} \frac{1}{2}(2c)^{p1} & 0 \leq c \leq 0.5 \\ \frac{1}{2}(2c-1)^{p2} + 0.5 & 0.5 < c \leq 1.0, \end{cases}$$

wherein,
y stands for the stretched result of each of the R, G, and B channel values of the corresponding foreground pixel, and $0 \leq y \leq 1$;
c stands for a normalized value obtained by carrying out normalization with regard to each of the R, G, and B channel values of the corresponding foreground pixel, and $0 \leq c \leq 1$; and
p1 and p2 stand for different empirical values set according to an actual circumstance.

14. The color enhancement method according to claim 13, wherein:
in the color tone adjustment step, the sum of the R, G, and B channel values of each of the foreground pixels is unchanged.

15. The color enhancement method according to claim 14, wherein:
in the color tone adjustment step, the R, G, and B channel values of each of the foreground pixels are adjusted so as to cause the intermediate one of the three channel values of the corresponding foreground pixel to be equal to the minimum one of the three channel values of the corresponding foreground pixel,
wherein, the three channel values after the color tone adjustment in the color tone adjustment step satisfy the following equations:

Max'=Max+d1;

Mid'=Mid−2*d1;

Min'=Min+d1; and

Mid−2*d1=Min+d1, wherein, Max', Mid', and Min' stand for the maximum one, the intermediate one, and the minimum one of the three channel values of the corresponding foreground pixel after the color tone adjustment; Max, Mid, and Min stand for the maximum one, the intermediate one, and the minimum one of the three channel values of the corresponding foreground pixel before the color tone adjustment; and d1 stands for first adjustment amount,
wherein, by considering that the three channel values of the corresponding foreground pixel ranges between 0 to 255 and employing the following relationships:

$$\begin{cases} Mid - 2*d1 = Min + d1 \\ Max + d1 \leq 255 \\ Min + d1 \leq 255 \\ Mid - 2*d1 \geq 0, \end{cases}$$

the first adjustment amount d1 is obtained as follows:

d1=Minimum((Mid−Min)/3,Mid/2,255−Max).

16. The color enhancement method according to claim 15, wherein:
the ratio of color saturation degree to color intensity of each of the foreground pixels is defined as follows: r=color saturation degree/color intensity,
in the saturation degree to intensity ratio adjustment step, second adjustment amount d2 is subtracted from the R, G, and B channel values of the corresponding foreground pixel, i.e., (R', G', B')=(R−d2, G−d2, B−d2), wherein, (R', G', B') stands for the three channel values of the corresponding foreground pixel after the ratio adjustment, and (R, G, B) stands for original values of the three channels of the corresponding foreground pixel,
wherein, the three channel values of the corresponding foreground pixel adjusted in the saturation degree to intensity ratio adjustment step satisfy the following relationships:

$$\begin{cases} (R', G', B') = (R - d2, G - d2, B - d2) \\ S' = r_d * I' \\ S' = 1 - 3\text{Min}(R', G', B')/(R' + G' + B') \\ I' = ((R' + G' + B')/255)/3 \\ S = 1 - 3\text{Min}(R, G, B)/(R + G + B) \\ I = ((R + G + B)/255)/3, \end{cases}$$

wherein, S' and I' stand for the color saturation degree and the color intensity of the corresponding pixel after the ratio adjustment; S and I stand for the color saturation degree and the color intensity of the corresponding pixel before the ratio adjustment; and the second adjustment amount d2 is as follows:

$$d2 = \frac{R+G+B}{3} - \sqrt{\frac{255(R+G+B-3\text{Min}(R,G,B))}{3r_d}}.$$

17. The color enhancement method according to claim 16, wherein:
in the saturation degree and intensity increase step, third adjustment amount d3 is subtracted from the R, G, and B channel values of the corresponding pixel, i.e., (R2, G2, B2)=(R−d3, G−d3, B−d3), wherein, (R2, G2, B2) stands for the three channel values of the corresponding foreground pixel after the color saturation degree increase, and (R, G, B) stands for the original values of the three channels of the corresponding foreground pixel,
in the saturation degree and intensity increase step, the color saturation degree of each of the foreground pixels is increased so as to cause the color saturation degree of the corresponding foreground pixel to satisfy the following relationship:

$$S_d = 1 - 3\text{Min}(R2, G2, B2)/(R2 + G2 + B2)$$
$$= 1 - 3(\text{Min}(R, G, B) - d3)/(R + G + B - 3d3) \Rightarrow d3$$
$$= (3\text{Min}(R, G, B) - (1 - s_d)(R + G + B))/(3S_d),$$

wherein, by considering that the three channel values of the corresponding foreground pixel ranges between 0 to 255 and employing the following relationship:

$$\begin{cases} R - d3 \geq 0 \\ G - d3 \geq 0 \\ B - d3 \geq 0 \end{cases}$$
$$\Rightarrow d3 \leq \text{Min}(R, G, B),$$

the third adjustment amount d3 is obtained as follows:

d3=Min(3Min(R,G,B)−(1−s_d)(R+G+B))/(3S_d),Min(R,G,B)).

18. The color enhancement method according to claim 17, wherein:
in the saturation degree and intensity increase step, the color intensity of each of the foreground pixels is increased by multiplying the R, G, and B channel values of the corresponding foreground pixel by a coefficient K, i.e., (R2', G2', B2')=K*(R2, G2, B2)=(K*R2, K*G2, K*B2), wherein, (R2', G2', B2') stands for the three channel values of the corresponding foreground pixel after the color intensity increase; (R2, G2, B2) stands for the three channel values of the corresponding foreground pixel after the color saturation degree increase; and the coefficient K is defined as K=Id/I2, and I2 stands for color intensity of the corresponding pixel whose R, G, and B channel values are (R2, G2, B2).

19. A whiteboard content sharing system comprising:

a video capture unit used to capture contents written on a whiteboard by a local user with a color whiteboard marker pen, and output the contents as a digital image;

a calculation unit used to obtain a whiteboard color image including whiteboard contents by carrying out image subtraction with regard to a whiteboard image captured by the video capture unit and a remotely shared whiteboard image transferred from a remote system, and carry out color enhancement with regard to the whiteboard color image;

a data transfer unit used to receive the shared whiteboard image from the remote system via a network, and send the whiteboard contents obtained by the calculation unit to the remote system; and a projection unit used to projecting the shared whiteboard image received from the remote system and the whiteboard contents obtained by the calculation unit on a screen for display, wherein, the calculation unit includes:

a whiteboard content extraction unit used to extract a foreground portion from the whiteboard color image, and let the foreground portion serve as the whiteboard contents;

a color channel stretch unit used to stretch R, G, and B channel values of each of a plurality of foreground pixels forming the extracted whiteboard contents;

a color tone adjustment unit used to adjust, under a condition where color intensity of each of the foreground pixels is unchanged, color tone of the corresponding foreground pixel;

a saturation degree to intensity ratio adjustment unit used to adjust, under a condition where the color tone of each of the foreground pixels is unchanged, a ratio of color saturation degree to color intensity of the corresponding foreground pixel so as to cause the ratio to approach a predetermined ratio expectation value $r_d$; and a saturation degree and intensity increase unit used to increase, under a condition where the color tone of each of the foreground pixels is unchanged, the color saturation degree and the color intensity of the corresponding foreground pixel so as to cause the two to approach a predetermined color saturation degree expectation value $S_d$ and a predetermined color intensity expectation value $I_d$, respectively.

* * * * *